United States Patent
Hindle et al.

(10) Patent No.: US 8,992,161 B2
(45) Date of Patent: Mar. 31, 2015

(54) GAS TURBINE ENGINES INCLUDING BROADBAND DAMPING SYSTEMS AND METHODS FOR PRODUCING THE SAME

(75) Inventors: Timothy Hindle, Peoria, AZ (US); Steven Hadden, Peoria, AZ (US); Torey Davis, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 651 days.

(21) Appl. No.: 13/219,287

(22) Filed: Aug. 26, 2011

(65) Prior Publication Data

US 2013/0051981 A1 Feb. 28, 2013

(51) Int. Cl.
*F01D 25/06* (2006.01)
*F01D 25/04* (2006.01)

(52) U.S. Cl.
CPC ............ *F01D 25/04* (2013.01); *F05D 2260/96* (2013.01); *Y02T 50/671* (2013.01)
USPC .............................................. 415/1; 415/119

(58) Field of Classification Search
USPC ................ 415/119, 121.3; 60/322; 244/173.2
See application file for complete search history.

(56) References Cited

U.S. PATENT DOCUMENTS

| | | | |
|---|---|---|---|
| 2,967,739 A | 1/1961 | Hoffman | |
| 3,015,523 A | 1/1962 | Semar | |
| 3,679,272 A | 7/1972 | Costa et al. | |
| 3,705,775 A | 12/1972 | Rioux | |
| 3,809,340 A | 5/1974 | Dolgy et al. | |
| 3,813,776 A | 6/1974 | Frederickson et al. | |
| 4,214,796 A | 7/1980 | Monzel et al. | |
| 4,370,094 A | 1/1983 | Ambrosch et al. | |
| 4,668,108 A | 5/1987 | McHugh | |
| 4,872,767 A | 10/1989 | Knapp | |
| 4,952,076 A | 8/1990 | Wiley, III et al. | |
| 5,028,001 A | 7/1991 | Bender et al. | |
| 5,044,781 A | 9/1991 | Werner | |
| 5,065,959 A | 11/1991 | Bhatia et al. | |

(Continued)

FOREIGN PATENT DOCUMENTS

JP 8326557 A 12/1996
WO 2005095822 A1 10/2005

OTHER PUBLICATIONS

GB Office Action, GB 1216644.3 dated Jan. 8, 2013.

(Continued)

*Primary Examiner* — Edward Look
*Assistant Examiner* — Aaron R Eastman
(74) *Attorney, Agent, or Firm* — Ingrassia Fisher & Lorenz, P.C.

(57) ABSTRACT

Gas turbine engine, broadband damping systems, and methods for producing broadband-damped gas turbine engine are provided. In one embodiment, the gas turbine engine includes an engine case, a rotor assembly mounted within the engine case for rotation about a rotational axis, and a broadband damping system disposed between the rotor assembly and the engine case. The broadband damping system includes a first set of three parameter axial dampers angularly spaced around the rotational axis, and a second set of three parameter axial dampers angularly spaced around the rotational axis and coupled in parallel with the first set of three parameter axial dampers. The first and second sets of three parameter axial dampers are tuned to provide peak damping at different rotational frequencies to increase the damping bandwidth of the broadband damping system during operation of the gas turbine engine.

18 Claims, 5 Drawing Sheets

(56) References Cited

U.S. PATENT DOCUMENTS

| | | | |
|---|---|---|---|
| 5,088,840 A | 2/1992 | Radtke | |
| 5,284,011 A | 2/1994 | Von Benken | |
| 5,305,981 A | 4/1994 | Cunningham et al. | |
| 5,332,070 A * | 7/1994 | Davis et al. | 188/298 |
| 5,421,655 A | 6/1995 | Ide et al. | |
| 5,484,120 A | 1/1996 | Blakeley et al. | |
| 5,501,531 A | 3/1996 | Hamaekers | |
| 5,531,522 A | 7/1996 | Ide et al. | |
| 5,603,574 A * | 2/1997 | Ide et al. | 384/117 |
| 5,613,781 A | 3/1997 | Kuzdzal et al. | |
| 5,810,319 A | 9/1998 | von Flotow et al. | |
| 5,947,240 A | 9/1999 | Davis et al. | |
| 5,947,457 A * | 9/1999 | Swanson et al. | 267/140.14 |
| 6,002,778 A | 12/1999 | Rossetti et al. | |
| 6,155,720 A | 12/2000 | Battig | |
| 6,325,327 B1 | 12/2001 | Zoppitelli et al. | |
| 6,325,546 B1 | 12/2001 | Storace | |
| 6,328,293 B1 | 12/2001 | Olsen | |
| 6,394,387 B1 | 5/2002 | Mitrovic | |
| 6,499,209 B1 | 12/2002 | Landin et al. | |
| 6,682,219 B2 | 1/2004 | Alam et al. | |
| 6,789,998 B2 | 9/2004 | Chen et al. | |
| 6,806,604 B2 | 10/2004 | Werfel et al. | |
| 6,883,967 B2 | 4/2005 | Robb et al. | |
| 6,935,591 B2 | 8/2005 | Udall | |
| 7,066,651 B2 | 6/2006 | Nicholas et al. | |
| 7,093,806 B2 | 8/2006 | Osterberg | |
| 7,121,729 B2 | 10/2006 | Davis et al. | |
| 7,182,188 B2 * | 2/2007 | Ruebsamen et al. | 188/298 |
| 7,384,199 B2 | 6/2008 | Allmon et al. | |
| 7,445,094 B1 * | 11/2008 | Henderson et al. | 188/267 |
| 7,524,112 B2 | 4/2009 | Gerez et al. | |
| 7,625,121 B2 * | 12/2009 | Pettinato et al. | 384/99 |
| 7,631,839 B1 | 12/2009 | Duncan et al. | |
| 7,731,426 B2 | 6/2010 | Meacham et al. | |
| 7,845,158 B2 | 12/2010 | Udall | |
| 7,878,448 B2 | 2/2011 | Olsen et al. | |
| 7,950,633 B2 | 5/2011 | Hiley et al. | |
| 8,001,764 B2 | 8/2011 | Parks et al. | |
| 8,256,750 B2 | 9/2012 | Cottrell et al. | |
| 8,794,912 B2 | 8/2014 | Nilsson et al. | |
| 2003/0132077 A1 | 7/2003 | Davis | |
| 2004/0004161 A1 * | 1/2004 | Osterberg | 244/165 |
| 2004/0245403 A1 * | 12/2004 | Osterberg | 244/158 R |
| 2005/0217954 A1 * | 10/2005 | Hindle et al. | 188/298 |
| 2006/0204153 A1 | 9/2006 | Alam et al. | |
| 2008/0148708 A1 | 6/2008 | Chou et al. | |
| 2009/0020381 A1 * | 1/2009 | Hindle et al. | 188/267 |
| 2009/0110572 A1 | 4/2009 | Meacham et al. | |
| 2009/0148271 A1 | 6/2009 | Alvanos et al. | |
| 2009/0183512 A1 | 7/2009 | Suciu et al. | |
| 2010/0207007 A1 * | 8/2010 | Cottrell et al. | 248/638 |
| 2013/0051981 A1 | 2/2013 | Hindle et al. | |
| 2013/0051982 A1 | 2/2013 | Hindle et al. | |
| 2013/0067931 A1 | 3/2013 | Hindle et al. | |

OTHER PUBLICATIONS

USPTO Office Action, Notification Date Jun. 10, 2014; U.S. Appl. No. 13/220,081.

USPTO Office Action, Notification Date Jun. 10, 2014; U.S. Appl. No. 13/239,115.

USPTO Office Action, Notification Date Oct. 23, 2014; U.S. Appl. No. 13/358,239.

USPTO Final Office Action, Notification Date Nov. 6, 2014; U.S. Appl. No. 13/239,115.

USPTO Office Action, Notification Date Feb. 10, 2015; U.S. Appl. No. 13/220,081.

USPTO Office Action, Notification Date Feb. 11, 2015; U.S. Appl. No. 13/358,239.

* cited by examiner

GAS TURBINE ENGINES INCLUDING BROADBAND DAMPING SYSTEMS AND METHODS FOR PRODUCING THE SAME

TECHNICAL FIELD

The present invention relates generally to vibration damping systems and, more particularly, to broadband damping systems, gas turbine engine including broadband damping systems, and methods for producing broadband-damped gas turbine engines.

BACKGROUND

Modern gas turbine engine are often equipped with relatively complex rotor assemblies including multiple coaxial, gear-linked shafts supportive of a number of compressors, air turbines, and, in the case of turbofan engines, a relatively large intake fan. During high speed rotation of the rotor assembly, vibrations originating from rotor imbalances, bearing imperfections, de-stabilizing forces, and the like may be transmitted through the rotor bearings, to the engine case, and ultimately to the aircraft fuselage. When physically and/or acoustically perceptible, rotor-emitted vibrations transmitted to the aircraft fuselage can decrease passenger comfort. Rotor-emitted vibrations may also reduce the operational lifespan of the engine components, such as the rotor bearings, and degrade various measures of engine performance, such as thrust output and fuel efficiency. Rotor-emitted vibrations reach their highest amplitudes during rotor critical modes; that is, when the rotational frequency of the rotor assembly induces significant off-axis motion of the rotor assembly due to, for example, deflection or bending of the rotor assembly spool (referred to as "critical flex modes") or rotor bearings eccentricies (referred to as "rigid body critical modes"). It is not uncommon for the rotor assembly of a multi-spool gas turbine engine to exhibit five or more critical modes distributed across the operational range of the gas turbine engine.

Active hydraulic devices referred to as squeeze-film dampers ("SFDs") can be disposed around one or more of the rotor bearings to help reduce the magnitude of rotor-emitted vibrations transmitted to the engine casing and aircraft fuselage. SFDs are, however, limited in several respects. SFDs are characterized by non-linear damping profiles and are consequently capable of providing optimal vibration attenuation only over a relatively narrow frequency range. Thus, while an SFD can be tuned to provide peak damping at a single, targeted rotor critical mode, the SFD will typically provide less-than-optimal damping at other operational frequencies and through other rotor critical modes. Furthermore, as the rotor critical modes vary in conjunction with changing rotor imbalances, SFDs may become gradually less effective at attenuating vibrations over the operational lifespan of the gas turbine engine. As a further limitation, the stiffness and damping profiles of an SFD are inherently linked and cannot be independently tuned. As a result, it can be difficult to optimize the damping characteristics of an SFD without reducing the stiffness thereof and, in so doing, sacrificing some degree of rotor centerline control. Poor centerline control decreases the ability of the SFD to counteract static loading conditions (e.g., gravity sag) and generally requires the provision of larger tip clearances within the gas turbine engine, which reduces overall engine efficiency.

It is thus desirable to provide embodiments of a gas turbine engine including a broadband damping system having an increased damping bandwidth, as taken over the operational frequency range of the engine's rotor assembly, to more effectively attenuate vibrations emitted from the rotor assembly through multiple critical modes. Ideally, embodiments of such a broadband damping system would have a substantially linear damping profile to permit high damping through a broad range of frequencies and loading conditions, while also having a substantially linear and independently-tunable stiffness profile to improve rotor centerline control. It would also be desirable to provide of such a broadband damping system that could be utilized in conjunction with other types of turbomachinery, such as turbochargers. Finally, it would be desirable to provide embodiments of a method for producing a broadband-damped gas turbine engine. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a gas turbine engine are provided. In one embodiment, the gas turbine engine includes an engine case, a rotor assembly mounted within the engine case for rotation about a rotational axis, and a broadband damping system disposed between the rotor assembly and the engine case. The broadband damping system includes a first set of three parameter axial dampers angularly spaced around the rotational axis, and a second set of three parameter axial dampers angularly spaced around the rotational axis and coupled in parallel with the first set of three parameter axial dampers. The first and second sets of three parameter axial dampers are tuned to provide peak damping at different rotational frequencies to increase the damping bandwidth of the broadband damping system during operation of the gas turbine engine.

Embodiments of a broadband damping system are further provided for usage within a turbomachine including a housing and a rotor assembly configured to rotate within the housing about a rotational axis. In one embodiment, the broadband damping system includes a first set of three parameter axial dampers angularly spaced around the rotational axis and positioned between the rotor assembly and the housing, and a second set of three parameter axial dampers angularly spaced around the rotational axis and positioned between the rotor assembly and the housing. The first and second sets of three parameter axial dampers are interspersed to form a multi-point mount supporting the rotor assembly within the housing. The first and second sets of three parameter axial dampers are tuned to provide peak damping at different frequencies over the operational frequency range of the rotor assembly.

Embodiments of a method for producing a broadband-damped gas turbine engine are still further provided. In one embodiment, the method includes the steps of providing a rotor assembly and an engine case, identifying a plurality of rotor critical modes of the rotor assembly over the operational range of the gas turbine engine, tuning first and second sets of three parameter axial dampers to provide peak damping at different frequencies distributed over a target frequency range encompassing the plurality of rotor critical modes, and installing the first and second sets of three parameter axial dampers in parallel between the rotor assembly and the engine case.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
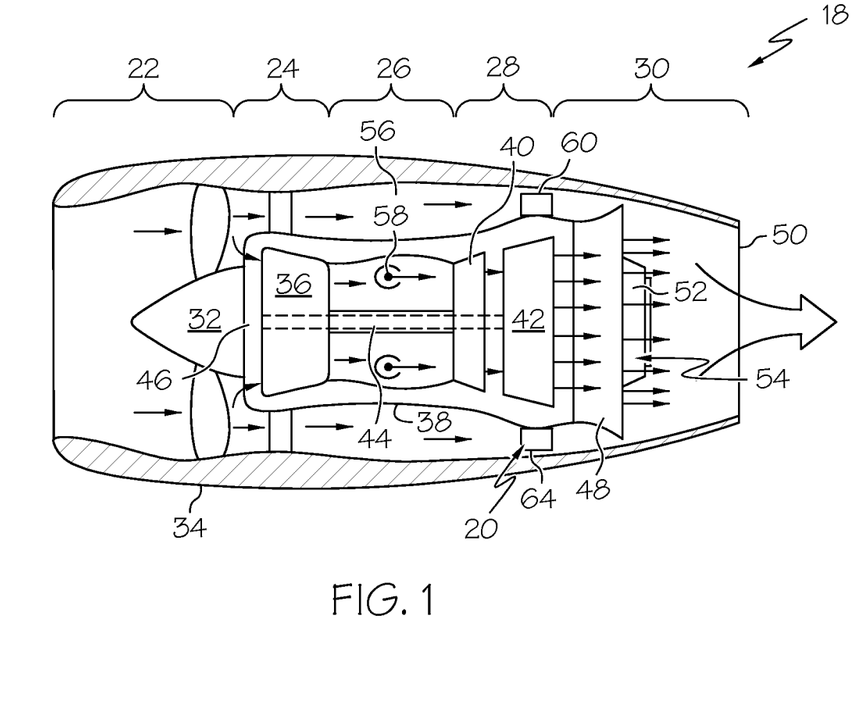
FIG. 1 is a simplified cross-sectional view a gas turbine engine including a broadband damping system and illustrated in accordance with an exemplary embodiment of the present invention.

FIG. 1 is a simplified cross-sectional view a broadband-damped gas turbine engine (GTE) 18 including a broadband damping system 20 and illustrated in accordance with an exemplary embodiment of the present invention. By way of example, GTE 18 is illustrated in FIG. 1 as a two spool turbofan engine including an intake section 22, a compressor section 24, a combustion section 26, a turbine section 28, and an exhaust section 30. Intake section 22 includes an intake fan 32 mounted in a nacelle assembly 34. In the illustrated example, compressor section 24 includes a single compressor 36, which is rotatably disposed within an engine case 38 mounted within nacelle assembly 34. Turbine section 28 includes a high pressure (HP) turbine 40 and a low pressure (LP) turbine 42, which are rotatably disposed within engine case 38 in flow series. Compressor 36 and HP turbine 40 are mounted to opposing ends of an HP shaft or spool 44, and intake fan 32 and LP turbine 42 are mounted to opposing ends of a LP shaft or spool 46. LP spool 46 and HP spool 44 are co-axial; that is, LP spool 46 extends through a longitudinal channel provided through HP spool 44. Engine case 38 and nacelle assembly 34 terminate in a mixer nozzle 48 and a propulsion nozzle 50, respectively. Mixer nozzle 48 cooperates with a centerbody 52 to form an exhaust mixer 54, which mixes hot combustive gas flow received from turbine section 28 with cooler bypass airflow during operation of GTE 18. Although not shown in FIG. 1 for clarity, a plurality of rotor bearing assemblies is disposed around HP spool 44 and LP spool 46 at various locations to facilitate high speed rotation of spools 44 and 46 within engine case 38. The rotor bearing assemblies commonly assume the form of rolling element bearings disposed around each end of HP spool 44 and LP spool 46.

As illustrated in FIG. 1 and described herein, broadband-damped GTE 18 is offered by way of example only. It will be readily appreciated that embodiments of the present invention are equally applicable to various other types of gas turbine engine including, but not limited to, other types of turbofan, turboprop, turboshaft, and turbojet engines, as well as to other types of turbomachinery. Furthermore, the particular structure of GTE 18 will inevitably vary amongst different embodiments. For example, in certain embodiments, GTE 18 may include an exposed intake fan (referred to as an "open rotor configuration") or may not include an intake fan. In other embodiments, GTE 18 may employ centrifugal compressors or impellers in addition to or in lieu of axial compressors. In still further embodiments, GTE 18 may include a single spool or three spools along with varying numbers of compressors and turbines. While primarily described below as deployed onboard an aircraft, GTE 18 is by no means limited to deployment onboard any particular platform and may also be deployed onboard other types of vehicles (e.g., watercraft and ground vehicles, such as tanks), included within auxiliary power units, or included within industrial power generators.

During operation of GTE 18, air is drawn into intake section 22 and accelerated by intake fan 32. A portion of the accelerated air is directed through a bypass flow passage 56, which is provided between nacelle assembly 34 and engine case 38 and conducts this airflow over and around engine case 38. The remaining portion of air exhausted from intake fan 32 is directed into compressor section 36 and compressed by compressor 36 to raise the temperature and pressure of the core airflow. The hot, compressed airflow is supplied to combustion section 26 wherein the air is mixed with fuel and combusted utilizing one or more combustors 58 included within section 26. The combustive gasses expand rapidly and flow through turbine section 28 to rotate HP turbine 40 and LP turbine 42. The rotation of turbines 40 and 42 drives the rotation of spools 44 and 46, respectively, which, in turn, drives the rotation of compressor 36 and intake fan 32. After flowing through turbine section 28, the combustive gas flow is then directed into exhaust section 30 wherein mixer 54 mixes the combustive gas flow with the cooler bypass air received from bypass flow passages 56. Finally, the combustive gas flow is exhausted from GTE 18 through propulsion nozzle 50 to produce forward thrust.

Due to rotor imbalances, bearing imperfections, de-stabilizing forces, and the like, vibrations are produced during rotation of spools 44 and 46, and transmitted through the non-illustrated rotor bearing assemblies, through engine case 38, and ultimately to the aircraft fuselage. The transmission of vibrations to the fuselage can decrease passenger comfort, detract from engine performance, and limit the operational lifespan of the rotor bearing assemblies and other engine components. Broadband damping system 20 reduces the magnitude of vibrations of the rotor system, as well as the vibratory forces transmitted from the rotor assembly to engine case 38 over a broad bandwidth as compared to conventional bearing support dampers, such as squeeze film dampers. In so doing, broadband damping system 20 is able to provide highly effective vibration attenuation through multiple rotor critical modes distributed across the frequency range of the rotor assembly during operation of GTE 18. As a further advantage, broadband damping system 20 provides a highly linear and independently-tunable stiffness profile. As a result, broadband damping system 20 can be tuned to provide a relatively high static and dynamic stiffness to improve rotor centerline control and thereby improve the overall efficiency of GTE 18. The manner in which broadband damping system 20 is able damp vibrations over a relatively broad bandwidth is described more fully below conjunction with FIGS. 2-5. While described below in conjunction with a gas turbine engine, it is emphasized that embodiments of broadband damping system 20 can be utilized in conjunction with other types of turbomachinery including, for example, turbochargers.

Figure 2:
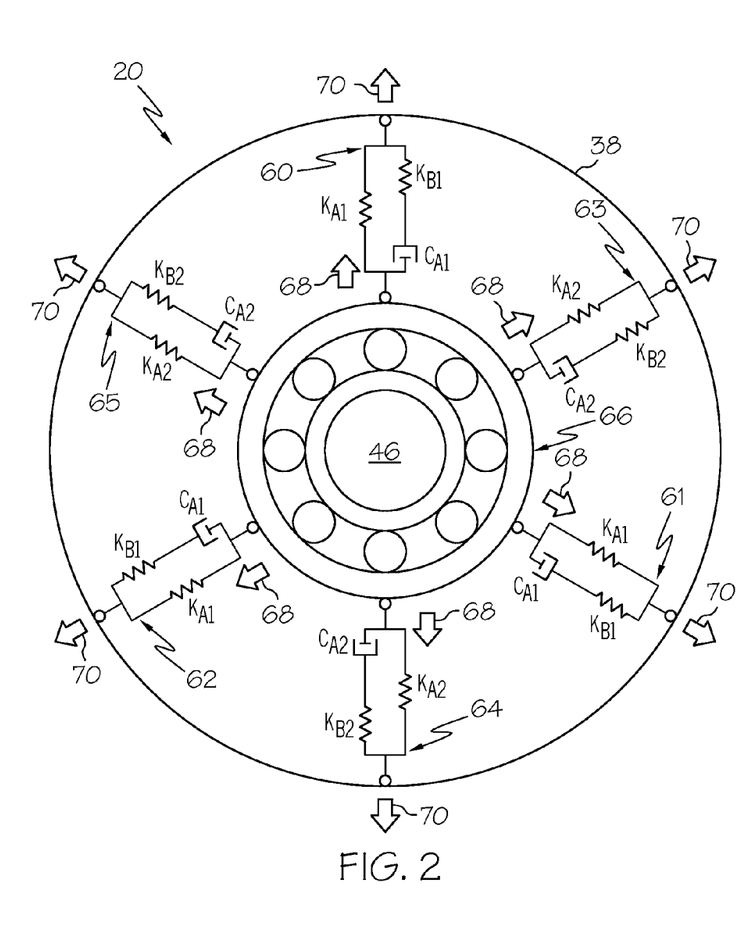
FIG. 2 is a schematic illustrating a plurality of three parameter axial dampers included within the broadband damping system shown in FIG. 1.

FIG. 2 is a schematic diagram illustrating a plurality of three parameter axial dampers 60-65 included within broadband damping system 20. As appearing herein, the term "axial damper" refers to a damper or vibration isolator having at least a single degree of freedom and provides damping in at least an axial direction, although the possibility that axial dampers 60-65 could have multiple degrees of freedoms is by no means excluded. Axial dampers 60-65 are kinetically coupled between engine case 38 and a rotor bearing assembly 66, as taken along a disturbance transmission path extending from rotor bearing assembly 66 to the mounting interface of GTE 18 (FIG. 1). Rotor bearing assembly 66 supports a rotatable shaft or spool, which is identified as LP spool 46 in FIG. 2 for the purposes of providing a complete, albeit non-limiting example. In the simplified schematic shown in FIG. 2, rotor bearing assembly 66 is generically illustrated as consisting solely of a ball bearing; however, it will be appreciated that rotor bearing assembly 66 may include any number and type of rotor bearings, including other types of rolling element bearings (e.g., roller bearings), and any number of additional structural elements supportive of or otherwise coupled to the rotor bearing or bearings.

Axial dampers 60-65 are circumferentially arranged or spaced around the rotational axis of rotor bearing assembly 66 and, more generally, the rotational axis of the rotor assembly in which LP spool 46 is included. In preferred embodiments, axial dampers 60-65 assume the form of or include elongated struts, which extend radially outward from rotor bearing assembly 66 in a radially spoked configuration. Collectively, axial dampers 60-65 provide damping in two degrees of freedom within a plane (the X-Y plane) substantially orthogonal to the rotational axis of the rotor assembly and to the engine centerline (the Z-axis). Stated differently, axial dampers 60-65 collectively provide damping along vertical and lateral axes substantially parallel with the yaw and pitch axes, respectively, of the host aircraft on which GTE 18 (FIG. 1) is deployed.

Broadband damping system 20 includes at least four axial dampers, which are divided into two separately-tuned groupings or sets each including at least two axial dampers, as described in detail below. In the illustrated example, broadband damping system 20 includes six dampers 60-65, which are symmetrically arranged around the rotor bearing assembly 66 such that dampers 60-65 are spaced apart at regular intervals of approximately 60 degrees. Advantageously, such a symmetrical spacing provides a highly stable multi-point mount supporting rotor bearing assembly 66 and LP spool 46. However, in further embodiments, axial dampers 60-65 may be asymmetrically arranged around rotor bearing assembly 66 such to impart broadband damping system 20 with varying stiffness and damping properties in different radial directions. For example, axial dampers 60-65 may be asymmetrically arranged around rotor bearing assembly 66 to provide an anisotropic stiffness better accommodating known rotordynamic issues; e.g., to counteract static loading due to the weight of GTE 18 and thereby prevent gravity sag and to better accommodate high magnitude impact forces that may occur in the downward direction during aircraft landing. In addition to or as an alternative to asymmetrical spacing, dampers 60-65 may have stiffness and damping properties that are individually tuned to provide such anisotropic properties.

By definition, each three parameter axial damper includes three mechanical members: (i) a first spring member (the main spring), which is coupled between spool 46 and engine case 38; (ii) a second spring member (the tuning spring), which is coupled between spool 46 and engine case 38 in parallel with the tuning spring; and (iii) a damper member, which is coupled between spool 46 and engine case 38 in parallel with the main spring and in series with the tuning spring. The main spring and tuning spring have spring rates of $K_A$ and $K_B$, respectively. The damper has a damping constant of $C_A$. Advantageously, three parameter devices can be tuned to provide superior damping characteristics (i.e., a lower overall transmissibility) as compared to undamped devices and two parameter devices over a given frequency range. Transmissibility may be expressed by the following equation:

$$T(\omega) = \frac{X_{ouput}(\omega)}{X_{input}(\omega)} \qquad \text{EQ. 1}$$

wherein $T(\omega)$ is transmissibility, $X_{input}(\omega)$ is the input motion, and $X_{output}(\omega)$ is the output motion. In the case of broadband damping system 20, specifically, the input motion is the radial displacement of rotor bearing assembly 66, as represented in FIG. 2 by arrows 68; and the output motion is the radial displacement of engine case 38, as represented in FIG. 2 by arrows 70.

Figure 3:
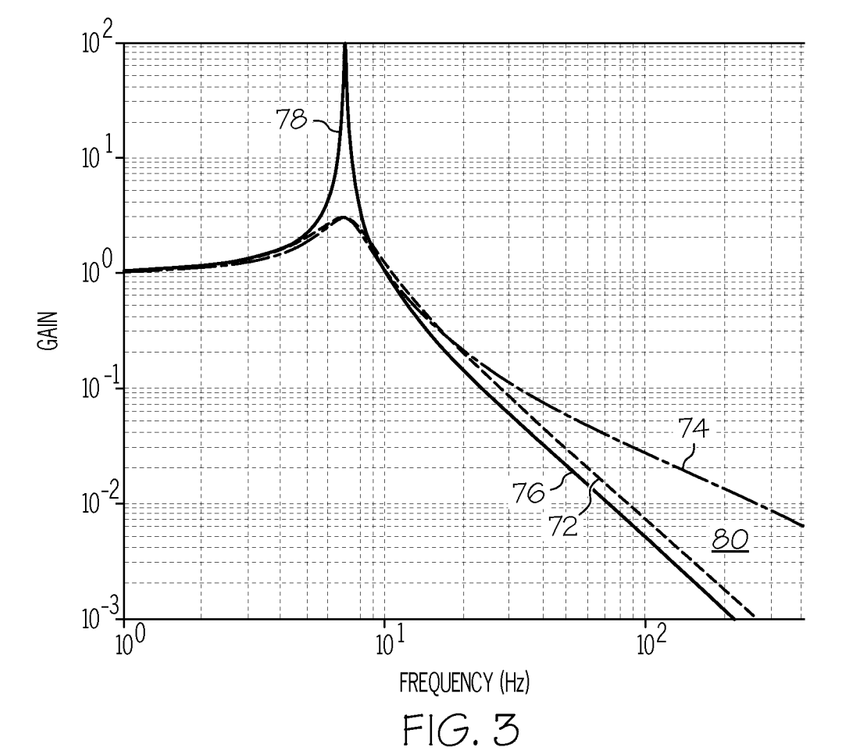
FIG. 3 is a transmissibility plot of frequency (horizontal axis) versus gain (vertical axis) illustrating the exemplary transmissibility profile of a three parameter axial damper as compared to the transmissibility profiles of a two parameter damper and an undamped device.

FIG. 3 is a transmissibility plot illustrating the damping characteristics of three parameter axial damper (curve 72) as compared to a two parameter damper (curve 74) and an undamped device (curve 76). As indicated in FIG. 3 at 78, the undamped device (curve 76) provides a relatively high peak gain at the resonant frequency, which, in the illustrated example, is moderately less than 10 Hertz (Hz). By comparison, the two parameter device (curve 74) provides a significantly lower peak gain at the threshold frequency, but an undesirably gradual decrease in gain with increasing frequency after the threshold frequency has been surpassed (referred to as "roll-off"). In the illustrated example, the roll-off of the two parameter device (curve 74) is approximately −20 decibel per decade ("dB/decade"). Lastly, the three parameter device (curve 72) provides a low peak gain substantially equivalent to that achieved by the two parameter device (curve 74) and further provides a relatively steep roll-off of about −40 dB/decade. The three parameter device (curve 72) thus provides a significantly lower transmissibility at higher frequencies, as quantified in FIG. 3 by the area 80 bounded by curves 72 and 74.

Figure 4:
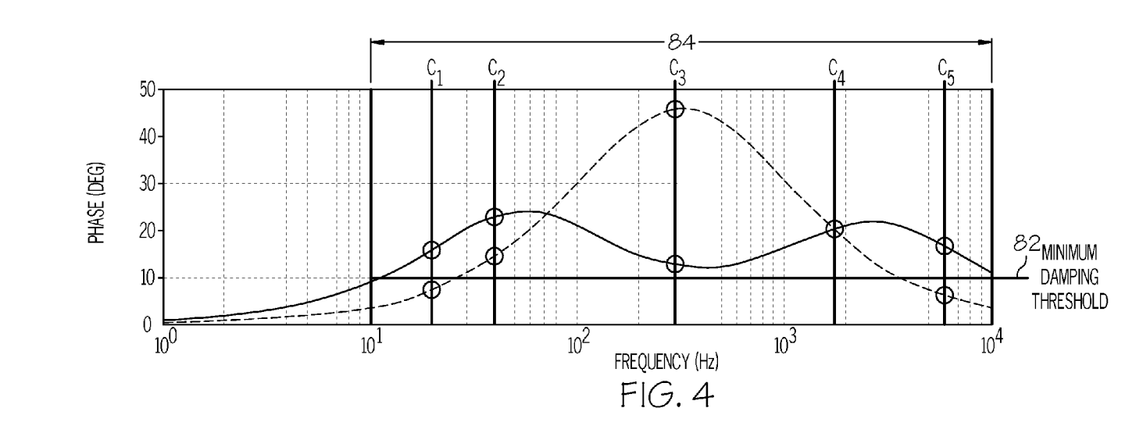
FIG. 4 is a graph of frequency (horizontal axis) versus phase (vertical axis) illustrating the exemplary damping profile of two three parameter axial dampers, which are coupled in parallel and which have varied tunings (solid line), and the exemplary damping profile of two three parameter axial dampers, which are coupled in parallel and which have identical tunings (dashed line)

Dampers 60-65 are divided into two groupings or sets: a first set of three parameter axial dampers 60-62 and a second set of three parameter axial dampers 63-65. The sets of axial dampers are tuned such that axial dampers 60-62 provide peak damping at a different frequency as compared to axial dampers 63-65; e.g., in preferred embodiments, the peak damping frequency of axial dampers 60-62 and the peak damping frequency of axial dampers 63-65 differs by a factor of at least about 10. This may be more fully appreciated by referring to FIG. 4, which is a graph of frequency (horizontal axis) versus phase (vertical axis) illustrating the exemplary damping profile of a pair of three parameter axial dampers, which are coupled in parallel and which are disparately-tuned to provide peak damping at a frequency less than 100 Hz and a frequency greater than a 1000 Hz, versus the exemplary damping profile of a pair of three parameter axial dampers, which are coupled in parallel and which are identically-tuned to provide peak damping at a single frequency between 100 and 1000 Hz. Assume, for the purpose of this example, that it is desired to maintain damping above a minimum damping threshold (identified in FIG. 4 by horizontal line 82) for a targeted frequency range (identified in FIG. 4 by double-headed arrow 84) encompassing a plurality of rotor critical modes $C_1$-$C_5$. The targeted frequency range may correspond with the operational frequency range of the rotor assembly or, instead, may only encompass a portion thereof. As can be seen in FIG. 4, the damping profile of the identically-tuned dampers (dashed line) peaks near the midpoint of the targeted frequency range, but tapers off rapidly in either direction. The identically-tuned dampers thus provide exceptionally and unnecessarily high damping at critical mode $C_3$ and acceptable damping at nearby critical modes $C_2$ and $C_4$, but provide relatively poor damping at outlying critical modes $C_1$ and $C_5$. By comparison, the disparately-tuned dampers provide damping exceeding the minimum damping threshold over the entirety of the targeted frequency range and encompassing all rotor critical modes $C_1$-$C_5$.

The parameters of dampers 60-65 can be selected in any manner that provides the above-described disparity in peak damping. In many embodiments, each of the dampers included within damper set 60-62 will be tuned to have parameters that are substantially identical, as will each of the dampers included within damper set 63-65. Stated differently, each damper within the first set of three parameter axial dampers 60-62 can be tuned to have a main spring rate approximately equal to $K_{A1}$, a tuning spring rate approximately equal to $K_{B1}$, and a damping constant approximately equal to $C_{A1}$. Similarly, each damper included the second set of three parameter axial dampers can be tuned to have a main spring rate approximately equal to $K_{A2}$, a tuning spring rate approximately equal to $K_{B2}$, and a damping constant approximately equal to $C_{A2}$. To provide the above-described disparity in peak damping, at least one of the $K_{A1}$, $K_{B1}$, and $C_{A1}$ will vary with respect to $K_{A2}$, $K_{B2}$, and $C_{A2}$, respectively. In general, $K_{B1}$ and $C_{A1}$ will typically differ from $K_{B2}$ and $C_{A2}$, respectively, by at least 10%. In certain embodiments, $K_{B1}$ will exceed $K_{B2}$ by a factor of two or more. At the same time, $C_{A1}$ will typically be significantly less than $C_{A2}$; e.g., in certain embodiments, $C_{A2}$ may exceed $C_{A1}$ by a factor of at least 10. In such embodiments, $K_{A1}$ and $K_{A2}$ may be approximately equal. With respect to the exemplary graph shown in FIG. 4, for example, the identically-tuned dampers (dashed line) have a main spring rate ($K_A$) of approximately 17.5E6 N/m, a tuning spring rate ($K_B$) of approximately 87.5E6 N/m, and a damping coefficient ($C_A$) of approximately 17.5E3 N/(m/s). By comparison, the first damper in the pair of disparately-tuned dampers (solid line) has a $K_{A1}$ value of approximately 17.5E6 N/m, a $K_{B1}$ rate of approximately 17.5E6 N/m, and a $C_{A1}$ coefficient of approximately 3.5E3 N/(m/s); while the second disparately-tuned damper has a $K_{A2}$ rate of approximately 17.5E6 N/m, a $K_{B2}$ rate of approximately 43.8E6 N/m, and a $C_{A2}$ coefficient of approximately 87.5E3 N/(m/s).

Figure 5:
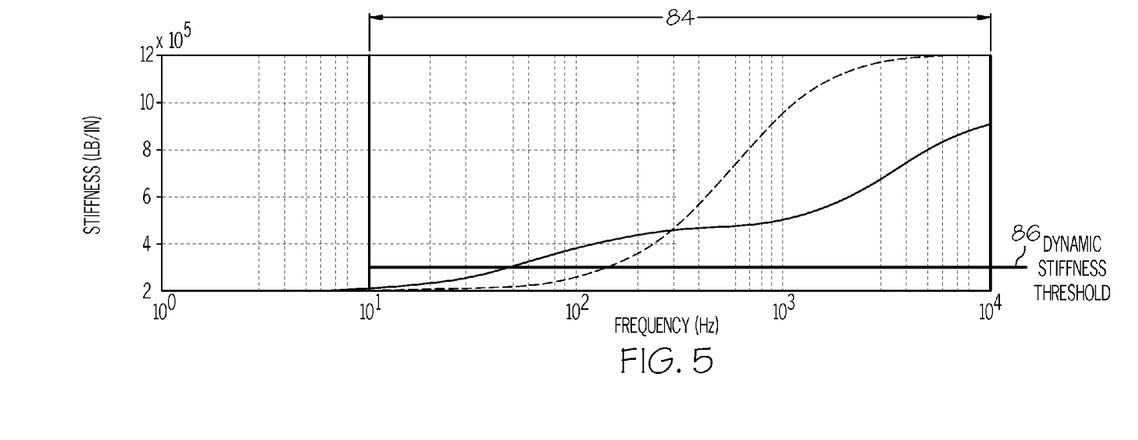
FIG. 5 is a graph of frequency (horizontal axis) versus stiffness (vertical axis) illustrating the exemplary stiffness profile of two three parameter axial dampers, which are coupled in parallel and which have varied tunings (solid line), and the exemplary damping profile of two three parameter axial dampers, which are coupled in parallel and which have identical tunings (dashed line)

Advantageously, three parameter devices of the type described above enable separate or independent tuning of stiffness and damping profiles. The axial dampers of broadband damping system 20 can thus be tuned to provide relatively high static and dynamic stiffnesses over the operational frequency range of the rotor assembly. Further illustrating this point, FIG. 5 is a graph of frequency (horizontal axis) versus stiffness (vertical axis) illustrating the exemplary stiffness profiles for the identically-tuned damper (dashed line) and the disparately-tuned dampers (solid line) described above in conjunction with FIG. 4. As was the case previously, a doubled-headed arrow 84 identifies an exemplary targeted frequency range, which may encompass the entirety or only a portion of operational frequency range of the rotor assembly. A desired minimum dynamic stiffness threshold is further identified in FIG. 5 by vertical line 86. The stiffness profile of the disparately-tuned dampers (solid line) exceeds the desired dynamic stiffness threshold for a greater portion of the targeted frequency range than does the stiffness profile of the identically-tuned dampers (dashed line). The disparately-tuned dampers thus provide an improved stiffness profile that enables better centerline control of the rotor assembly over the operational frequency range, which, in turn, results in an overall increase in engine efficiency. Both the identically-tune and disparately-tuned systems in FIG. 5 provide the same static stiffness, therefore producing the same centerline motion for quasi-static or low frequency inputs.

Figure 6:
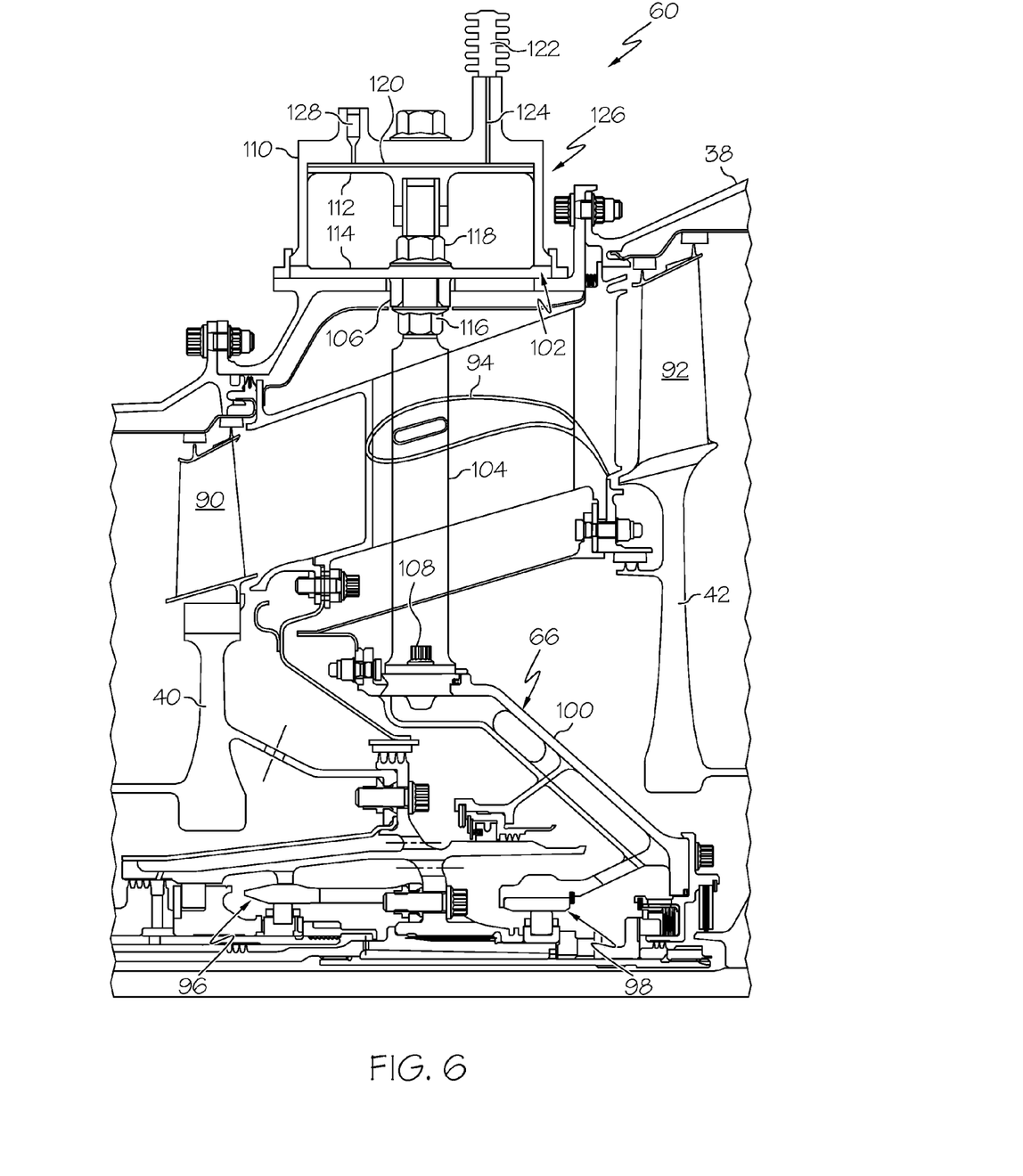
FIG. 6 is a cross-sectional view taken through a portion of the gas turbine engine shown in FIG. 1 and illustrating an exemplary manner in which one of the three parameter axial dampers included within the broadband damping system shown in FIGS. 1 and 2 can be structurally implemented.

Axial dampers 60-65 (FIG. 2) can be implemented in any manner and may include any number of structural elements providing the above-described three parameter functionality. FIG. 6 is a cross-sectional view taken through a portion of broadband-damped gas turbine engine 18 (FIGS. 1 and 2) and illustrating one manner in which axial damper 60 (and thus axial dampers 61-65) can be structurally implemented. In addition to axial damper 60, the illustrated portion of GTE 18 includes a first rotating blade 90 included within HP turbine 40, a second rotating blade 92 included within LP turbine 42, a stationary blade 94 positioned between HP turbine 40 and LP turbine 42, and a rotor bearing assembly 66. Rotor bearing assembly 66 includes a first rotor bearing 96, a second rotor bearing 98, and a stationary bearing housing member 100 (e.g., a conical wall). Axial damper 60 includes a main damper unit 102, which is mounted to the exterior of engine case 38; and an elongated strut 104, the outer radial end of which attaches to main damper unit 102 through a radial opening 106 provided in engine case 38. Strut 104 extends radially inward from main damper unit 102, through stator vane 94, and to bearing housing member 100. The inner radial end of strut 104 is affixed to bearing housing member 100 utilizing, for example, a plurality of bolts 108 or other such fasteners.

Main damper unit 102 includes a damper housing 110 containing first and second radially-compliant flexures 112 and 114. Flexure 114 is affixed to the outer end of strut 104 by way of a radial adjustment device 116, and flexure 112 is fixedly coupled to the outer end of strut 104 by a radial extension piece 118. Notably, radial adjustment device 116 enables the radial position of strut 104, and thus the radial position of rotor bearing assembly 66, to be fine-tuned after assembly of GTE 18 (FIG. 1) to provide centerline adjustment; i.e., precise centering of the rotor assembly spool. By way of this structural arrangement, flexures 112 and 114 are each mechanically coupled between strut 104 and damper housing 110 or, more generally, between rotor bearing assembly 66 and engine case 38. Flexure 112 cooperates with the interior of housing 110 to define a hydraulic chamber 120 within main damper unit 102, which is filled with a silicon oil or other suitable damping fluid. Hydraulic chamber 120 is fluidly coupled to a bellows 122 by way of a fluid conduit or channel 124. Collectively, hydraulic chamber 120, bellows 122, and conduit 124, along with the damping fluid contained therein, form a damper device 126. During operation of main damper unit 102, the geometry of hydraulic chamber 120 changes in conjunction with deflections of flexure 112, and hydraulic fluid flows between hydraulic chamber 120 and bellows 122 as required to accommodate such geometric changes. Damping is thus provided by viscous losses as the damping fluid is exchanged between hydraulic chamber 120 and bellows 122. Bellows 122 serves the function of supplying a pre-load pressure into the system, as well as serving as a thermal compensation device to accommodate volumetric changes in damping fluid. In further embodiments, bellows 122 may be replaced by a rigid damping fluid chamber, in which case damper device 126 may include an independent thermal compensation device (e.g., a spring-loaded piston) fluidly coupled to hydraulic chamber 120. Damper device 126 may be further equipped with a fill port 128 to permit post-assembly filling of hydraulic chamber 120.

During operation of axial damper 60, vibrations emitted from the rotor assembly are transmitted through rotor bearing assembly 66, through radially-disposed strut 104, and to main damper unit 102. Main damper unit 102 servers as a three parameter device providing two vibration transmission paths to engine case 38. The first vibration transmission path extends from strut 104 through flexure 114 and to damper housing 110 and, therefore, to engine case 38. Vibrations traveling along this path are effectively shunted around flexure 112 and hydraulic chamber 120. Vibrations transmitted along this path are attenuated by deflection of flexure 114, which serves as the main spring and is wholly or predominately determinative the main spring rate $K_A$. The second vibration transmission path extends from strut 104, through flexure 112, through hydraulic chamber 120, and to damper housing 110. Vibrations transmitted along this path are thus attenuated both by deflection of flexure 112, which functions as the tuning spring, and by the corresponding displacement of damping fluid within damper device 126. Flexure 112 is a small contributor to the overall $K_A$ parameter, and is additionally part of the parameter $K_B$ in that $K_B$ is determined by the compliance of the containment chamber generally formed by flexures 112 and 114 and bellows 122. Lastly, damper device 126 is wholly or predominately determinative of the damper constant $C_A$.

The structural implementation of axial damper 60 described above in conjunction with FIG. 6 is provided by way of non-limiting example only. In further embodiments, axial dampers 60-65 (FIG. 2) may assume other forms. Notably, three parameter axial dampers generally suitable for usage as axial dampers 60-65 are commercially utilized in conjunction within precision isolation systems deployed onboard satellite and other spacecraft. An example of an axial three parameter axial damper or vibration isolator is the D-STRUT® isolator developed and commercially marketed by Honeywell, Inc., currently headquartered in Morristown, N.J. Such commercially-available vibration isolators are commonly packaged as elongated struts, which may be circumferentially positioned around the rotor assembly in a spoke-type arrangement with each strut affixed between the rotor bearing assembly and the engine case. With respect to the exemplary embodiment shown in FIG. 6, in particular, each three parameter strut may be positioned within GTE 18 in essentially in the same manner as is strut 104, thereby eliminating the need for a case-mounted damper unit, such as main damper unit 102.

The foregoing has thus provided embodiments of a gas turbine engine including a broadband damping system having an increased damping bandwidth, as taken over the frequency range of the engine's rotor assembly, to more effectively attenuate vibrations emitted from the rotor assembly through multiple critical modes. The above-described broadband damping system provided substantially linear damping profiles to permit high damping through a broad range of frequencies and loading conditions (amplitudes), while also providing a substantially linear and independently-tunable stiffness profile to improve rotor centerline control. While described above primarily in conjunction with a gas turbine engine, it will be appreciated that embodiments of the broadband damping system are also well-suited for usage in conjunction with other types of turbomachinery, including turbochargers. In such embodiments, the broadband damping system may include first and second sets of three parameter axial dampers angularly spaced around the rotational axis of the turbomachine's rotor assembly and positioned between the rotor assembly and the turbomachine's stationary housing, as taken along a vibration transmission path.

The foregoing has also provided embodiments of a method for producing a broadband-damped gas turbine engine, such as GTE 18 (FIG. 1). In one embodiment, the method includes the steps of providing a rotor assembly and an engine case (e.g., engine case 38 shown in FIGS. 1, 2, and 6); identifying a plurality of rotor critical modes of the rotor assembly over the operational range of the gas turbine engine; tuning first and second sets of three parameter axial dampers (e.g., dampers 60-65 shown in FIG. 5) to provide peak damping at different frequencies distributed over a target frequency range encompassing the plurality of rotor critical modes, as graphically indicated in FIG. 4; and installing the first and second sets of three parameter axial dampers in parallel between the rotor assembly and the engine case. During the installation, the first and second sets of three parameter axial dampers may be circumferentially spaced around the rotor assembly at predetermined intervals such that the first set of three parameter axial dampers is interspersed with the second set of three parameter axial dampers, as generally shown in FIG. 2.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A gas turbine engine, comprising:
an engine case;
a rotor assembly mounted within the engine case for rotation about a rotational axis and having a first critical mode; and
a broadband damping system disposed between the rotor assembly and the engine case, the broadband damping system comprising:
a first set of three parameter axial dampers angularly spaced around the rotational axis; and
a second set of three parameter axial dampers angularly spaced around the rotational axis and coupled in parallel with the first set of three parameter axial dampers, the first and second sets of three parameter axial dampers tuned to provide peak damping at different rotational frequencies to increase the damping bandwidth of the broadband damping system during operation of the gas turbine engine;
wherein the first set of three parameter axial dampers is tuned to provide peak damping at a frequency less than the frequency at which the first critical mode occurs, and wherein the second set of three parameter axial dampers is tuned to provide peak damping at a frequency greater than the frequency at which the first critical mode occurs.

2. A gas turbine engine according to claim 1 wherein the first set of three parameter axial dampers is interspersed with the second set of three parameter axial dampers.

3. A gas turbine engine according to claim 2 wherein the first and second sets of three parameter axial dampers are spaced around the rotational axis of the rotor assembly at substantially regular intervals.

4. A gas turbine engine according to claim 3 wherein the first and second sets of three parameter axial dampers each consist of three dampers.

5. A gas turbine engine according to claim 1 wherein the first and second sets of three parameter axial dampers provide damping in two degrees of freedom within a plane substantially orthogonal to the rotational axis.

6. A gas turbine engine according to claim 1 wherein each axial damper within the first set of three parameter axial dampers has a main spring rate approximately equal to $K_{A1}$, a tuning spring rate approximately equal to $K_{B1}$, and a damping constant approximately equal to $C_{A1}$.

7. A gas turbine engine according to claim 6 wherein each axial damper included in the second set of three parameter axial dampers has a main spring rate approximately equal to $K_{A2}$, a tuning spring rate approximately equal to $K_{B2}$, and a damping constant approximately equal to $C_{A2}$.

8. A gas turbine engine according to claim 7 wherein $K_{B1}$ and $C_{A1}$ differ from $K_{B2}$ and $C_{A2}$, respectively, by at least 10%.

9. A gas turbine engine according to claim 8 wherein $K_{B1}$ is greater than $K_{B2}$, and wherein $C_{A1}$ is less than $C_{A2}$.

10. A gas turbine engine according to claim 9 wherein $C_{A2}$ exceeds $C_{A1}$ by a factor of at least 10.

11. A gas turbine engine according to claim 8 wherein $K_{A1}$ is approximately equal to $K_{A2}$.

12. A gas turbine engine according to claim 1 further comprising a rotor bearing assembly supporting the rotor assembly and circumscribed by the broadband damping system.

13. A gas turbine engine according to claim 12 wherein each damper within the first and second sets of three parameter axial dampers comprises an elongated strut extending radially outward from the rotor bearing assembly.

14. A gas turbine engine according to claim 13 wherein each elongated strut comprises:
a radially inner end fixedly coupled to the rotor bearing assembly; and
a radially outer end fixedly coupled to the engine case.

15. A gas turbine engine according to claim 1 wherein the first and second sets of three parameter dampers comprise at least one radial adjustment mechanism enabling centering of the rotor assembly within the engine case.

16. A method for producing a broadband-damped gas turbine engine, comprising:
providing a rotor assembly and an engine case;
identifying a plurality of rotor critical modes of the rotor assembly over the operational range of the gas turbine engine;
tuning first and second sets of three parameter axial dampers to provide peak damping at different frequencies distributed over a target frequency range encompassing the plurality of rotor critical modes; and
installing the first and second sets of three parameter axial dampers in parallel between the rotor assembly and the engine case.

17. A method according to claim 16 wherein the step of tuning comprises:
tuning the first set of three parameter axial dampers to have a peak damping frequency less than a first engine critical mode; and
tuning the second set of three parameter axial dampers to have a peak damping frequency less than a first engine critical mode.

18. A method according to claim 16 wherein the step of installing comprises circumferentially spacing the first and second sets of three parameter axial dampers around the rotor assembly at predetermined intervals such that the first set of three parameter axial dampers is interspersed with the second set of three parameter axial dampers.

* * * * *